United States Patent
Pex et al.

(10) Patent No.: US 6,790,350 B2
(45) Date of Patent: Sep. 14, 2004

(54) MEMBRANE MODULE FOR THE SEPARATION OF FLUID MIXTURES

(75) Inventors: Petrus Paulus Antonius Catharina Pex, Den Helder (NL); Hartmut Ernst Arthur Brüschke, Nussloch (DE); Yvonne Christine Van Delft, Alkmaar (NL); Nicholas Patrick Wynn, Sarreguemines (FR); Henk Martin Van Veen, Alkmaar (NL); Frank-Klaus Marggraff, Homburg (DE)

(73) Assignee: Stichting Energieonderzoek Centrum Nederland, Le Petten (NL)

( * ) Notice: Subject to any disclaimer, the term of this patent is extended or adjusted under 35 U.S.C. 154(b) by 94 days.

(21) Appl. No.: 10/204,633

(22) PCT Filed: Feb. 23, 2001

(86) PCT No.: PCT/NL01/00154
§ 371 (c)(1),
(2), (4) Date: Dec. 2, 2002

(87) PCT Pub. No.: WO01/62371
PCT Pub. Date: Aug. 30, 2001

(65) Prior Publication Data
US 2003/0121840 A1 Jul. 3, 2003

(30) Foreign Application Priority Data
Feb. 24, 2000 (EP) ............................................. 00200640

(51) Int. Cl.⁷ .......................... B01D 29/54; B01D 61/36; B01D 63/06

(52) U.S. Cl. .............. 210/184; 210/321.79; 210/321.88
(58) Field of Search .................................. 210/175, 184, 210/252, 321.6, 321.79, 321.88

(56) References Cited

U.S. PATENT DOCUMENTS

| | | | | |
|---|---|---|---|---|
| 2,411,238 A | * | 11/1946 | Zender | 210/640 |
| 3,610,418 A | * | 10/1971 | Calderwood | 210/321.87 |
| 4,647,380 A | | 3/1987 | Dasgupta | |
| 4,976,866 A | | 12/1990 | Grinstead et al. | |
| 5,013,437 A | * | 5/1991 | Trimmer et al. | 210/321.78 |
| 5,141,640 A | * | 8/1992 | Sasajima et al. | 210/321.79 |
| 5,288,308 A | * | 2/1994 | Puri et al. | 96/8 |

* cited by examiner

Primary Examiner—Fred G. Prince
(74) Attorney, Agent, or Firm—Young & Thompson

(57) ABSTRACT

Apparatus for separating fluid mixtures includes plural tubular membranes parallel to each other. Each of the membranes has an inner lumen and the flow direction is from the exterior of the membrane to the inner lumen. Each tube is surrounded by a larger diameter feed tube and a gap is formed between the outside service of the tubular membrane and the inside service of the feed tube. This annulus provides a feed flow channel for the fluid mixture along the outer surface of the tubular membrane. The annulus has first and second ends connected to entrance and discharge ports respectively of the feed flow. The inner lumen of the tubular membranes are sealed from the annular gap and provided with a connection for the discharge of the permeate flow.

11 Claims, 3 Drawing Sheets

MEMBRANE MODULE FOR THE SEPARATION OF FLUID MIXTURES

The present invention relates to an apparatus for the separation of fluid mixtures according to the preamble of claim 1.

It is known to those skilled in the art that fluid mixtures can be separated by passing at least one component of a mixture selectively through a membrane while the other components are partially or fully retained. Such a process may be a filtration process in which particles or macromolecules of a fluid mixture are retained according to their size, e.g. in Microfiltration or Ultrafiltration. In other membrane processes molecules can be separated according to their chemical nature. e.g. in Reverse Osmosis, Pervaporation, Vapor Permeation, or Gas Separation Membranes suitable for such separations may be produced in a plane form, often referred to as flat sheet form, or in a tubular form, referred to as hollow fibers, capillaries or tubes. The direction of the transmembrane flux in such tubular membranes may be from the inside outwards or from the outside inwards.

For practical applications such membranes have to be incorporated into an apparatus known to those skilled in the art as a membrane module, in which a feed side of the membrane which is in contact with the mixture to be separated is separated and tightly sealed against a permeate side of the membrane, and both are separated from the outside environment. It is well known to those skilled in the art that especially in the membrane processes of molecular separation the tightness of the sealing between the feed and the permeate side of the membrane is essential. Whereas for flat membranes plate modules or spiral wound modules are widely used, tubular membranes are often incorporated as a bundle in a module similar to a tube-and-shell heat exchanger.

A tubular membrane may have the feed side as the outside or the inside surface and the permeate side respectively. If the direction of the transmembrane flux is from the inside to the outside of a tubular membrane the feed has to flow through the inner lumen of the tubular membrane and both ends of the tubular membrane have to be fixed into means sealing the inside of the lumen from the outside and allowing for a free flow of a fluid through the inside lumen of the tubular membrane. If the direction of the transmembrane flux is from the outside to the inside of the tubular membrane at least one end of the tubular membrane has to be fixed and sealed to the outside, the second side may just be closed or fixed and sealed.

It is known in the art that the transmembrane flux of matter and, in the case of pervaporation, of energy, can be split into several consecutive steps, the most important being at least:

i. the transport of matter and energy from the bulk of the feed fluid to the feed side of the membrane,
ii. the respective transport through the membrane, and
iii. the transport from the permeate side of the membrane into the bulk of the permeate.

The slowest of these consecutive steps will determine the overall flux through the membrane. For membranes with a low transmembrane flux the upstream and downstream mass (and energy) transport is usually sufficiently fast to be of negligible influence on the overall flux. If, however, the transmembrane flux is high the mass transport out of the bulk of the feed fluid to the membrane surface may be limiting the overall flux.

In a pervaporation process the lost energy needed for evaporation of the permeate will lead in all cases to a drop in the operation temperature and thus in a decrease of the overall membrane flux.

To those skilled in the art the effect of limiting mass transport to the feed surface of the membrane is known as concentration polarization and the limiting energy transport is known as temperature polarization, respectively. It is furthermore known that the polarization effects depend on the flow regime of the feed fluid which can best be described by the Reynolds number, which depends on the linear velocity of the feed flow tangential to the membrane surface and the geometry of the space adjacent to the feed surface.

For tubular membranes with the feed fluid in the inner lumen of the tube the flow regime can be determined and high Reynolds numbers can be achieved although, depending on the diameter of the inner lumen high volume flows may result. At high Reynolds number the polarization effects thus can be reduced, at the costs of a high volume flow rate and a high pressure loss.

The energy lost in a pervaporation process cannot be influenced by the Reynolds number.

For tubular membranes with the feed fluid flowing over the outside of the membrane the direction of the flow is mainly perpendicular to the outside surface of the tubular membrane. The Reynolds number cannot easily be determined and influenced: It is common in the art to use baffle plates in order to reverse the direction of the feed flow in a zigzag manner, in order to create a local turbulence and local high Reynolds numbers, however, the success of such means is limited and creates high pressure losses and volume flows. Therefore it is very difficult to realize, the full potential flux of such membranes in an industrial module.

EP 0652098A discloses a filtering device wherein the feed, preferably a molten polymer is introduced in parallel to the annular spaces between a filter cartridge and a surrounding further tube. The feed is substantially transferred through the filter cartridge and the remaining amount of the feed rejected by the filter cartridge is collected at the end of the annular space. The annular space is there converted into a small gap through which the rejected part of the feed is combined with the filtrate which has passed through the filter cartridge.

In this filter device the filtrate and the retentate are again combined in a collection chamber and discharged as one stream. The filter device thus has only one inlet for the feed and one outlet for the combined filtrate and retentate. It therefore cannot be used to split a feed stream into a retentate and a permeate stream which have to be discharged separately.

From U.S. Pat. No. 4,976,866 an apparatus is known according to the preamble of claim 1. A single tubular membrane is surrounded on the one hand by a larger diameter feed tube and inside the membrane a further membrane is provided. The annular gap between the two membranes is filled with an ion exchanging or absorbent material. At this device the Reynolds number can not easily be determined or influenced.

It is an object of the present invention to provide a membrane module for tubular membranes with the transmembrane flux from the outside to the inside of the tubular membrane, allowing to operate at high Reynolds numbers with a well defined tangential flow of the feed fluid over the membrane surface, allowing to realize the full potential flux through such membranes but avoiding unnecessary high volume flows and pressure losses.

It is a further object of the present invention to provide a membrane module which allows to optimize the feed fluid flow regime.

It is a further object of the present invention to provide a membrane module which allows for a continuous exchange of thermal energy with the feed fluid, e.g. the energy lost in a membrane separation (e.g. pervaporation) process through the membrane or the energy produced or consumed in a reaction in the feed fluid and thus to operate at constant temperatures of the feed fluid.

It is a further object of the present invention to provide a membrane module having an inlet for the feed, and outlet for the retentate and an outlet for the permeate, thus separating the feed stream into two distinct product streams.

This aim is realized in a separation device having the characterizing features of claims 1.

In a membrane module of the present invention one end of at least one tubular membrane is fixed and sealed into a membrane tube sheet and the second end is closed. The tubular membrane is installed coaxial into a second tube, the feed tube, a first end of said feed tube is fixed and sealed into a first feed tube sheet and a second end is fixed and sealed into a second feed tube sheet. An annulus gap is formed between the outside surface of the tubular membrane and the inner surface of the feed tube, and by appropriate means a first compartment is formed between the membrane tube sheet, and the first feed tube sheet. The feed mixture to be separated by the membrane flows through said compartment formed between the membrane tube sheet and the first feed tube sheet into the annulus gap between the outer surface of the tubular membrane and the inner surface of the feed tube and leaves said annulus gap at the second feed tube sheet. At least two tubular membranes are provided each having a separate feed flow channel. The feed flow channels can be connected in parallel or in series.

By changing the inner diameter of the feed tube or the outer diameter of the tubular membrane the dimension of the annulus gap can be changed and adjusted. Surprisingly it has been found that by such an adjustment the flow of the mixture to be separated can be directed fully tangential over the outside surface of the tubular membrane and any value of the Reynolds number of the feed mixture to be separated can be reached. By introducing turbulence promoters between the outside surface of the tubular membrane and the inner surface of the feed tube good mixing of the feed fluid and turbulent flow can be reached at low Reynolds numbers. Such turbulence promoters can additionally be utilized as a footing of the tubular membrane against the feed tube. By this arrangement the disadvantages known in the operation of a tubular membrane with the transmembrane flux directed from the outside to the inside of the tubular membrane can be overcome.

The feed tube may be made from any material known in the art, e.g. metal, ceramic, graphite, polymers, suitable for the service.

A tubular membrane designed for a transmembrane flux from the outside to the inside is fixed and sealed at least at a first end into a plate known to those skilled in the art as a tube sheet (membrane tube sheet). The membrane tube sheet may be made from a single or several polymers, from metal, glass, ceramics, carbon, or any other material known to those skilled in the art.

It is furthermore known to those skilled in the art that a tubular membrane can be made from different materials, e.g. a single polymer, different layers of polymeric materials, inorganic materials like glass, ceramics, zeolite, carbon or metal or metal alloys or any combination thereof. The membrane may comprise a single layer or several layers of the same material or of different materials, the cross section of the wall of the tubular membrane may have a symmetric or asymmetric structure.

The fixation of the first end of the tubular membrane in the membrane tube sheet and the sealing of the inside lumen of the tubular membrane to the outside may be effected by potting, gluing, welding, threaded connection, with or without gasket material, as familiar to those skilled in the art. By the same means several smaller tubular membranes may be connected to one longer tubular membranes.

For any application for an apparatus according to the present invention a tight seal of the tubular membrane in the membrane tube sheet is essential. The second end of the tubular membrane may be fixed into a second membrane tube sheet in a same manner as the first side of the tubular membrane or closed by any means known to those skilled in the art and mechanically supported or only closed. By these means two compartments are created, a feed compartment connected with the outer surface of the tubular membrane, and a permeate compartment, connected with the inner lumen and inner surface of the tubular membrane with both compartments tightly sealed against each other. The permeate compartment may be connected with appropriate means for the removal of the matter passing through the membrane and for keeping permeation conditions in an appropriate state, e.g. by applying low pressure or passing a sweep gas over the permeate side of the membrane.

By fixation and sealing the second end of the feed tube in a second feed tube sheet and by supporting the second (closed) end of the tubular membrane in a support sheet a second compartment can be formed by appropriate means between said support plate and said second feed tube sheet.

It is a further object of the present invention to use a plurality of tubular membranes, arranged in parallel, each membrane tube fixed and sealed with its first end into a membrane tube sheet and each second end of each tubular membrane closed and supported by a support plate. Each said tubular membrane is coaxial mounted into a feed tube, each feed tube fixed with its first end into a first feed tube sheet and with its second end into a second feed tube sheet. The first compartment formed between said first feed tube sheet and the membrane tube sheet is provided with a connection for the introduction, and the second compartment between said second feed tube sheet and said support plate is provided with a connection for the discharge, respectively, of the feed fluid to be separated. Appropriate means are installed in said first and said second compartment for a distribution of the feed fluid into said annulus gaps. By such means the flow of the feed fluid may be directed in parallel through all said annulus gaps. By modifying said distribution means in said first and said second compartment the flow direction of the feed mixture may be reversed at each end of an annulus gap, and the feed may be flowing in series through all annulus gaps, or any combination of parallel or serial flow can be achieved. By such means an optimization of the flow path of the feed fluid over the membrane surface with respect to any requirements of the membrane process is possible. The inlet and outlet connections may thus be at an even number of passes at one side of the bundle of tubular membranes.

It is a further object of the present invention to use the wall of the feed tube, enclosing the tubular membrane, as a wall of a heat exchanger. The outside of the feed tube may thus be heated or cooled by any means known to those skilled in the art. When a heating or cooling medium is used both ends of the feed tube are fixed and sealed in feed tube sheets and both feed tube sheets are fixed and sealed in a housing or shell, like a tube and shell heat exchanger known to those skilled in the art.

In a preferred embodiment a plurality of tubular membranes is arranged in parallel and fixed and sealed at each respective first end into a membrane tube sheet. The second end of each tubular membrane is closed by an appropriate means, e.g. a cap. The plurality of tubular membranes is inserted into a conventional shell and tube heat exchanger with one tubular membrane coaxial in one heat exchanger tube which acts as the feed tube, and an annulus gap between the outside surface of each tubular membrane and the inside surface of each respective heat exchanger tube. A gasket is placed between the membrane tube sheet and the first heat exchanger tube sheet forming a first compartment sealed against the outer environment and tightly sealed against the permeate compartment, said first compartment provided with at least one connection for the entrance of the feed fluid. This gasket may be made from any sealing material known to those skilled in the art and compatible with the feed fluid and the operation conditions. The second (closed) end of each tubular membrane rests in a support plate which mechanically supports the second side of each tubular membrane. Between the second heat exchanger tube sheet and the support plate a second gasket is placed, forming a second compartment sealed against the outer environment and against the permeate side of the membrane, the second compartment provided with at least one connection for the outlet of the feed fluid. In this embodiment the feed fluid is flowing in parallel through the plurality of annulus gaps formed between the inner wall of each heat exchanger tube and the outer surface of each membrane. The inner lumen of the tubular membranes is open on the other side of the membrane tube sheet and connected to the permeate compartment. By appropriate means in said compartment the inner lumen of the tubular membranes may be swept by a sweeping medium.

In another preferred embodiment the tubular membrane may be fixed at the first end and at the second end into a first and a second membrane tube sheet. By this means two permeate compartments are formed and permeate can leave the inner lumen of the tubular membrane at the first and the second end. A first and a second gasket are then placed between the first and second membrane tube sheet and first and second heat exchanger tube sheet, respectively, forming and sealing a respective compartment between each pair of tube sheets. The inner lumen of the tubular membranes may be swept by a sweeping medium.

In another preferred embodiment said first and said second compartment for the feed fluid are provided with means separating each end of each annulus gap from the plurality of the other annulus gaps but connecting the end of one annulus gap with the respective end of an adjacent annulus gap. The feed flow thus enters a first annular gap, at the end of the first annulus gap the flow is directed into an adjacent second annulus gap and the flow direction is reversed. By appropriate means the feed fluid can be directed to pass all annulus gaps in series. By connecting more than two adjacent ends of annulus gaps any combination of parallel and serial flow can be reached.

In another preferred embodiment the gasket between said heat exchanger tube sheets and the membrane tube sheets or said membrane support plate is a plate made of the gasket materials. Openings in the gasket plate act as the means separating each end of each annulus gap from the plurality of the other annulus gaps but connecting the end of one annulus gap with the respective end of an adjacent annulus gap and directing the feed fluid flow accordingly.

In another preferred embodiment the flow is arranged in such a way that an even number of passes for the feed fluid is provided and inlet and outlet connections of the feed fluid are situated at the same side of the bundle of tubular membranes.

In another preferred embodiment the feed fluid is a reaction mixture, without or with a homogeneous or heterogeneous catalyst.

In another preferred embodiment the heterogeneous catalyst may be fixed to the membrane, to the inner wall of the second tube or inserted into the annulus gap between the outer surface of the membrane and the inner surface of said second tube.

In another preferred embodiment the outside surfaces of the heat exchanger tubes may be heated by steam or any other heating means known to those skilled in the art or cooled by appropriate means, according to the requirements of the membrane process. The invention will be further elucidated referring to preferred embodiments of the invention shown in the drawings, wherein.

Figure 1:
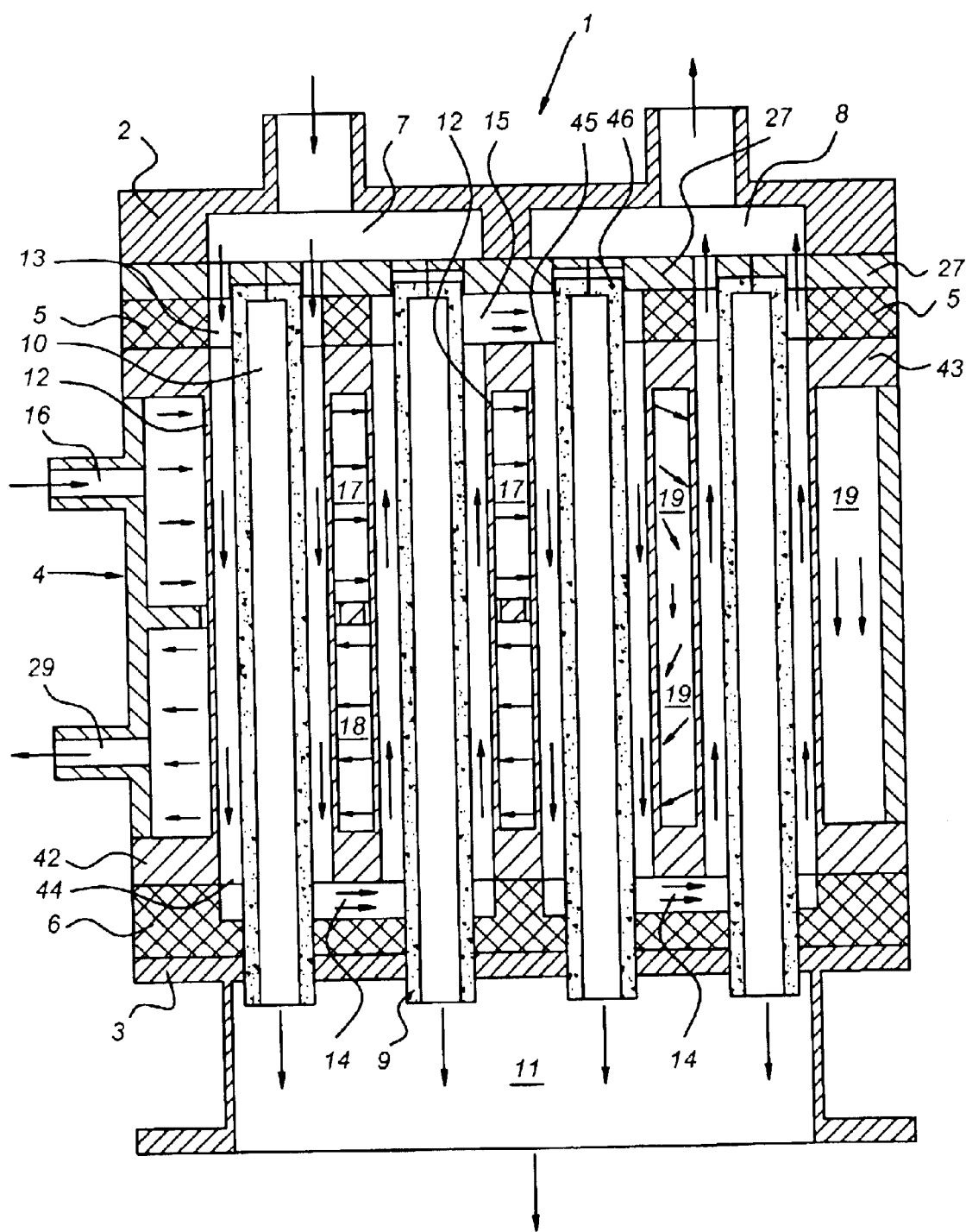
FIG. 1 shows in cross-section a first preferred embodiment of the invention (four tubular membranes in series)

In FIG. 1 a membrane unit is shown which is embodied as so called "isothermal membrane module". Such unit can be used for pervaporation or other membrane processes wherein at transfer of substance through the membrane wall is combined with the flow of heat. Through the use of a heat exchanging medium any heat lost or generated is compensated for.

The unit according to the invention is generally referred to by 1. It comprises a top cover plate 2 and a membrane tube sheet 3. The body of the unit is referred to by 4. Bottom gasket 6 is provided between the body 4 and the membrane tube sheet 3. 42 shows a first feed tube sheet whilst 43 refers to a second feed tube sheet. Between body 4 and top plate 2 a support plate 27 is provided and sealing between support plate 27 and body 4 is effected through gasket 5.

Top cover plate 2, support plate 27 and gasket 5 define a compartment 7 for introducing of feed to be separated, whilst 8 is another compartment formed by cover plate 2, support plate 27 and gasket 5, connected with an outlet for the feed material. Tubular membranes 9 are provided being mounted in membrane tube sheet 3 and closed and sealed at their top end. Permeate entering the interior 10 of each of the membrane tubes is discharged in permeate compartment 11 to a permeate out conduit. Around each tubular membrane 9 a feed tube 12 is provided having a larger internal diameter than the outer diameter of each tubular membrane 9. The annular space or gap so formed is referred to by 13. This annular space has two ends, the first end referred to by body 44, whilst the second end is referred to by body 45. From FIG. 1 it is clear that the several annular compartments are connected in series through bottom channels 14 and top channels 15 in gasket 6 and gasket 5. 46 is the second end of the membrane, i.e. a closed end of the ceramic tube, which is received in support plate 27.

Heat exchanging is effected through a heating or cooling media inlet 16 connected to an upper compartment 17. This upper compartment 17 is connected to a lower compartment 18 as is shown by arrows 19. Lower compartment 18 is connected to a heating or cooling media outlet 29.

Figure 3:
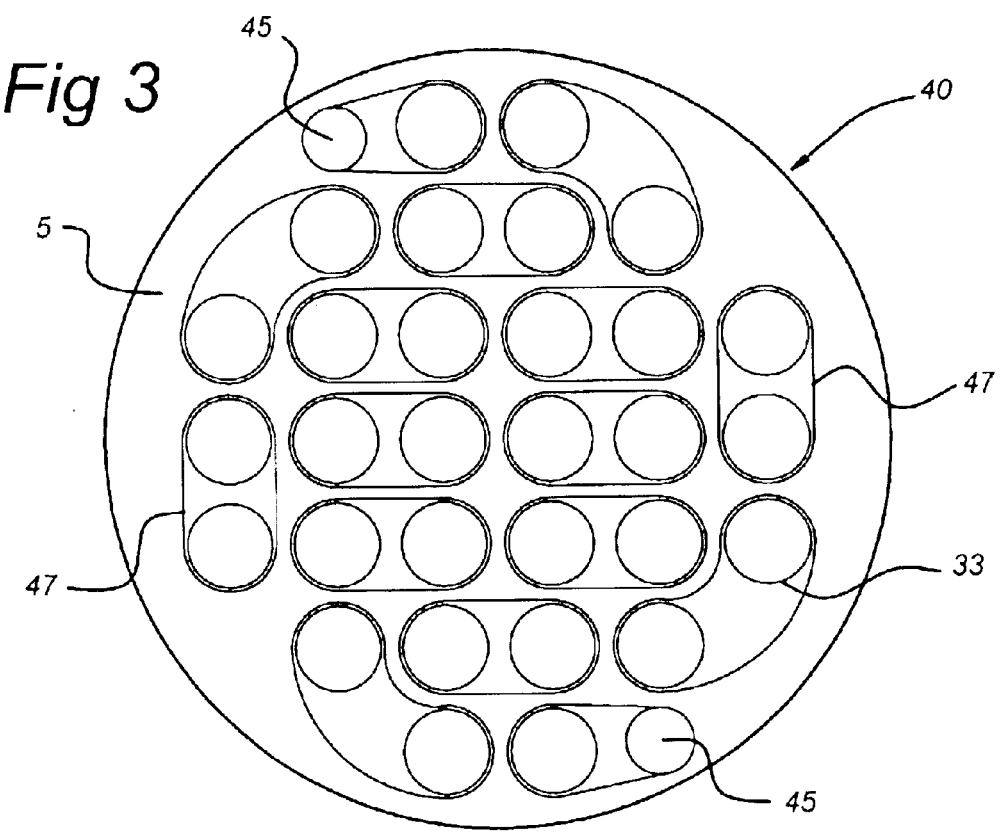
FIG. 3 shows a top view of a gasket plate to be used at second end of the device according to FIG. 2; but having thirty membrane tubes in series.
Figure 4:
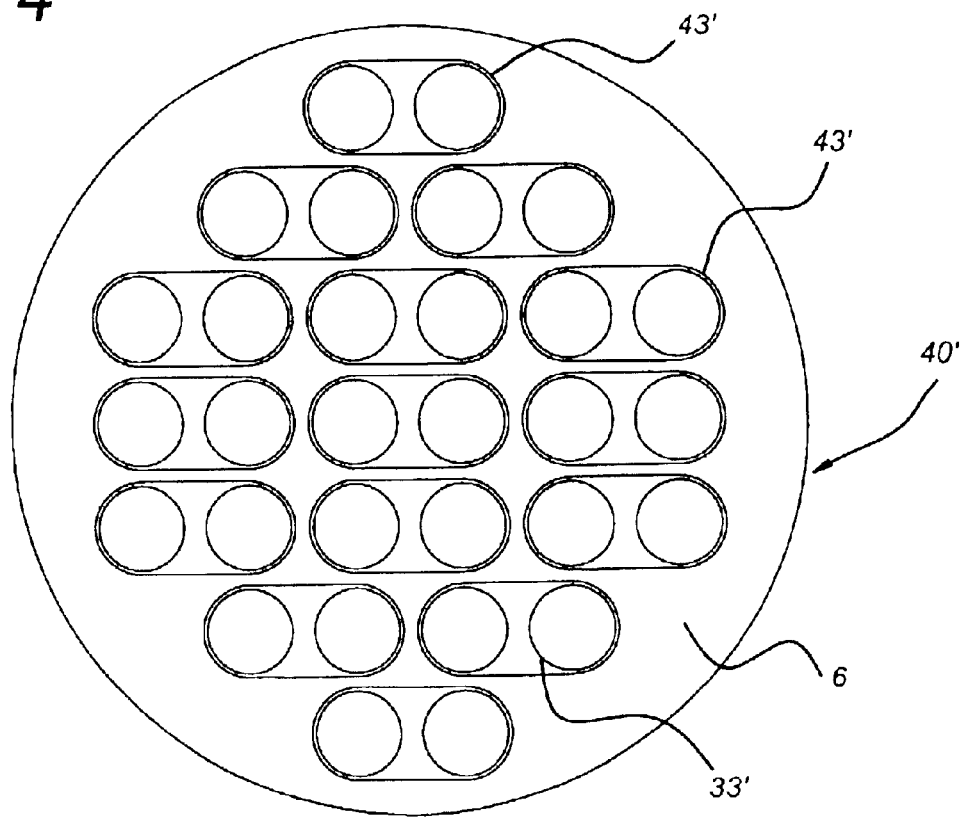
FIG. 4 shows a top view of a gasket plate to be used at the first end of the device according to FIG. 2, but having thirty membrane tubes in series.

In FIG. 3 details of gasket plate 5 are given. Connections between thirty annular gaps 13 in series are shown in this figure. FIG. 4 shows respective bottom gasket plate 6 and the connections realized therein. With the device according to FIG. 1, and gasket plates as in FIGS. 3 and 4 a continuous flow of feed can be realized, with thirty tubular membranes 9 and annular gaps 13 in series. In a single flow step sufficient separation of permeate can be realized. By heating or cooling the feed flow sufficient heat exchange at the spot where such heat is lost or generated can be achieved. It will be obvious for a person skilled in the art that by changing the openings of gasket plates 5 and 6 a different flow pattern can easily be obtained which thus can be optimized for the respective application.

Figure 2:
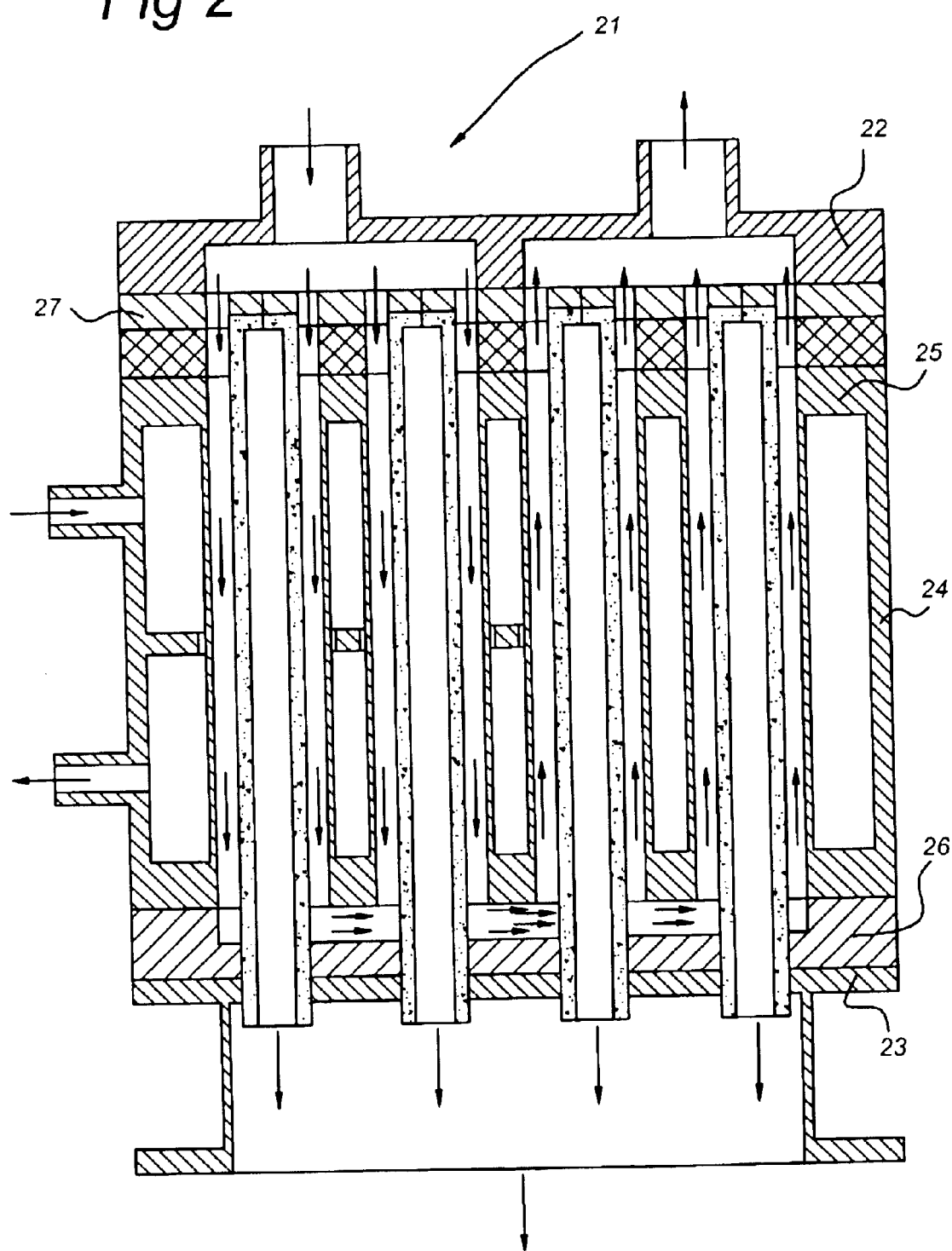
FIG. 2 shows in cross-section another preferred embodiment of the invention (two pairs of two tubular membranes in parallel, pairs in series)

FIG. 2 shows a further embodiment of the invention generally referred to by 21. Also in this embodiment a top plate 22 and a membrane tube sheet 23 are provided connected to body 24 through gaskets 25, 26 respectively. It is immediately clear from FIG. 2 that a completely different flow pattern can be obtained by only changing the top and bottom gasket plate. Further components of the unit according to FIG. 2 can be identical to the embodiment shown in FIG. 1. Provision of a different top and bottom gasket plate is relatively cheap and easy. This means at low costs the flow pattern through the membrane module can easily be changed. I.e. a universal membrane module with different sets of gasket plates can be adapted and optimized for several separation processes Although the invention has been described referring to preferred embodiments of the invention the person skilled in the art will immediately recognize that further embodiments are possible. These and further amendments are obvious and within the scope of the enclosed claims.

What is claimed is:

1. An apparatus for the separation of fluid mixtures comprising:

a tubular membrane having an inner lumen, and having a direction of a permeate flow from an outside surface to the inner lumen, said tubular membrane being surrounded by a larger diameter feed tube forming an annular gap between the outside surface of the tubular membrane and an inside surface of the feed tube, said annular gap providing a feed flow channel for the fluid mixture along the outer surface of the tubular membrane, said annular gap having a first end and a second end, each said first and said second end connected with means for entrance and discharge of the feed flow and with means to direct the feed flow through said channel, the inner lumen of the tubular membrane being sealed from the annular gap and provided with a connection for the discharge of the permeate flow, wherein at least two of said tubular membranes are arranged adjacent and in parallel to each other, each of said membranes being surrounded by a separate larger diameter feed tube, and the feed flow channel of one of said two membranes is in fluid communication with the feed flow channel of the other of said two membranes.

2. The apparatus according to claim 1, having, at least a first end of each tubular membrane if fixed and sealed in a first membrane tube sheet, each feed tube sealed at the first and at the second end of the annular gap into a first and a second feed tube sheet, an outside surface of the feed tubes sealed from the annular gap.

3. The apparatus according to claim 2, having a first compartment formed between the first membrane tube sheet and the first feed tube sheet by a first gasket, and a second compartment formed between a cover plate and the second feed tube sheet by a second gasket, said first compartment being connected to the first end of each annular gap and said second compartment being connected to the second end off each annular gap.

4. The apparatus according to claim 3, wherein said gasket is a gasket plate having openings, each of said openings corresponding with one end of at least one of said annular gaps, said openings acting as said means directing the feed flow to the annular gaps.

5. The apparatus according to claim 3, having a second end of each tubular membrane supported by a support plate, said cover plate being said support plate.

6. The apparatus according to claim 3, having a second end of each tubular membrane fixed and sealed in a second membrane tube sheet.

7. The apparatus according to claim 5, having said second compartment formed between said second membrane tube sheet and said second feed tube sheet.

8. The apparatus according to claim 4, wherein said openings are arranged to direct the feed flew through said annular gaps in parallel.

9. The apparatus according to claim 4, wherein said openings are arranged to direct the feed flow through said annular gaps in series.

10. The apparatus according to claim 1, wherein said feed tubes comprise heat exchanger tubes, with a heating or a cooling medium directed over the outside surface of each heat exchanger tube.

11. The apparatus according to claim 1, having means for the removal of a gaseous permeate from the inner lumen of the tubular membranes by a sweeping gas.

* * * * *